US006408661B1

(12) United States Patent
Chen

(10) Patent No.: US 6,408,661 B1
(45) Date of Patent: Jun. 25, 2002

(54) PADLOCK ASSEMBLY WITH A TWO-PART U-SHAPED LOCK CASING

(76) Inventor: Waterson Chen, 8F, No. 428, Wu-Chuan-Nan Rd., Taichung City (TW)

( * ) Notice: Subject to any disclaimer, the term of this patent is extended or adjusted under 35 U.S.C. 154(b) by 0 days.

(21) Appl. No.: 09/395,521

(22) Filed: Sep. 14, 1999

(51) Int. Cl.[7] .................................................. B60R 25/00

(52) U.S. Cl. .............................. 70/33; 70/226; 70/233; 70/54; 70/423

(58) Field of Search .............................. 70/32–34, 225, 70/226, 233, 234, 368, 371, 54–56, 423, 424, 427, 428, 455

(56) References Cited

U.S. PATENT DOCUMENTS

| | | | | | |
|---|---|---|---|---|---|
| 627,238 | A | * | 6/1899 | Peterson | 70/423 |
| 1,195,808 | A | * | 8/1916 | Grgich | 70/423 |
| 2,104,981 | A | * | 1/1938 | Falk | 70/33 |
| 2,656,704 | A | | 10/1953 | Mancuso | 70/128 |
| 2,930,219 | A | * | 3/1960 | Fansmith | 70/54 X |
| 2,999,377 | A | * | 9/1961 | Raye | 70/32 |
| 3,714,804 | A | * | 2/1973 | French | 70/423 X |
| 3,858,419 | A | * | 1/1975 | Hampton | 70/55 |
| 4,222,253 | A | * | 9/1980 | Peitsmeier | 70/368 X |
| 4,286,445 | A | * | 9/1981 | Sills | 70/55 |
| 4,404,825 | A | | 9/1983 | Dixon et al. | 70/368 |
| 4,869,082 | A | * | 9/1989 | Appelbaum | 70/54 X |
| 4,881,391 | A | * | 11/1989 | Villa et al. | 70/423 X |
| 4,953,371 | A | * | 9/1990 | Appelbaum | 70/32 |
| 5,365,758 | A | * | 11/1994 | Shieh | 70/33 |
| 5,442,941 | A | | 8/1995 | Kahonen et al. | 70/34 |
| 5,517,837 | A | | 5/1996 | Wang | 70/226 |
| 5,544,506 | A | | 8/1996 | Nakano | 70/34 |
| 5,979,200 | A | | 11/1999 | Cliff | 70/491 |
| 5,987,939 | A | | 11/1999 | Pitisettakarn | 70/33 |

FOREIGN PATENT DOCUMENTS

| | | | | |
|---|---|---|---|---|
| CH | 472564 | | 6/1969 | |
| DE | 2810756 | | 9/1978 | |
| IT | 411689 | | 3/1945 | |
| IT | 412692 | | 2/1946 | |
| IT | 417571 | | 1/1947 | |
| IT | 435219 | * | 3/1948 | 70/33 |
| IT | 455873 | | 3/1950 | |

* cited by examiner

*Primary Examiner*—Suzanne Dino Barrett
(74) *Attorney, Agent, or Firm*—Merchant & Gould P.C.

(57) ABSTRACT

A padlock assembly includes a first lock casing part having a lock core mounting portion formed with a core receiving space in a longitudinal direction, and a first shackle mounting portion that extends in a first transverse direction from one side of the lock core mounting portion. A lock mechanism includes a key operated lock core disposed rotatably in the core receiving space, and a latch member connected to one end of the lock core in such a manner that the latch member is disposed outwardly of the core receiving space. A second lock casing part has a latch engaging portion formed with a latch recess and a latch retainer disposed therein to partition the latch recess into a latch retention portion and a latch entrance portion via which the latch member is extendible into the latch retention portion and so as to be rotatable therein between locking and unlocking positions. The latch retainer engages the latch member when disposed in the latch retention portion to prevent removal of the same in the longitudinal direction away from the latch engaging portion. A shackle bar extends between the first and second shackle mounting portions, and has one end connected removably to a respective one of the shackle mounting portions.

13 Claims, 11 Drawing Sheets

PADLOCK ASSEMBLY WITH A TWO-PART U-SHAPED LOCK CASING

FIELD OF THE INVENTION

The invention relates to a padlock, more particularly to a padlock assembly with a two-part U-shaped lock casing.

BACKGROUND OF THE INVENTION

Referring to FIG. 1, a conventional padlock assembly is shown to include a U-shaped lock casing 10, a key-operated lock mechanism 16 mounted in the lock casing 10 at a lower portion thereof, and a straight shackle bar 14 with first and second shackle grooves 141, 142 and inserted into an upper portion of the lock casing 10 for retaining an object 1 on the lock casing 10.

As illustrated, the lock casing 10 has a lock core mounting portion 101 that defines a lock core receiving space 160 in a longitudinal direction, and first and second shackle mounting portions 11,12 that extend from one side of the lock core mounting portion 101 in a transverse direction. The first and second shackle mounting portions 11, 12 are spaced apart from each other in the longitudinal direction. The first shackle mounting portion 11 has a shackle passage 111 in the longitudinal direction, and a first tumbler retention hole 110 in the transverse direction and in communication with the shackle passage 111. The second shackle mounting portion 12 is formed with a shackle retaining blind hole 121 aligned with the shackle passage 111, and a second tumbler retention hole 151 in the transverse direction and in communication with the blind hole 121 and the core receiving space 160. The lock mechanism 16 includes a cylindrical lock core 161 disposed in the lock core receiving space 160 and rotatable thereinside between locking and unlocking positions upon insertion of a corresponding key, a first spring-loaded tumbler 112 disposed in the first tumbler retention hole 110, and a second spring-loaded tumbler 15 disposed in the second tumbler retention hole 151 and connected operably to one end of the lock core 161 so as to be co-rotatable therewith such that the second spring-loaded tumbler 15 will retract into the second tumbler retention hole 151 when the lock core 161 is at the unlocking position, thereby permitting removal of the shackle bar 14 in the longitudinal direction away from the first shackle mounting portion 11.

Some of the disadvantages of the aforesaid lock apparatus are as follows:

(a) The lock core 161 is not removable from the lock receiving space 160. As such, in case of spring fatigue that can lead to undesired disengagement between the shackle bar 14 and the tumblers 112, 15, the entire padlock assembly has to be discarded.

(b) When an object 1 is inserted between the first and second shackle mounting portions 11, 12 so as to be retained on the shackle bar 14, the engaging hole 2 of the object 1 is generally concealed by the shackle mounting portions 11, 12. As a result, the user has to feel and move, with the assistance of his fingers, the engaging hole 2 of the object 1 into alignment with the shackle passage 111 and the blind hole 121 prior to insertion of the shackle bar 14 between the first and second shackle mounting portions 11, 12. This inconveniences the user of the conventional padlock assembly.

SUMMARY OF THE INVENTION

The main object of this invention is to provide a padlock assembly which is clear of the aforesaid disadvantages that generally result from the use of the conventional padlock assembly.

Accordingly, the padlock assembly of the present invention includes a first lock casing part, a key-operated lock mechanism, a second lock casing part, and a shackle bar. The first lock casing part has a hollow lock core mounting portion with front and rear end surfaces that are spaced apart from each other in a longitudinal direction. The lock core mounting portion is formed with a core receiving space that extends in the longitudinal direction through the front and rear end surfaces. A first shackle mounting portion extends in a first transverse direction relative to the longitudinal direction from one side of the lock core mounting portion. The lock mechanism includes a cylindrical lock core formed with a key hole and disposed in the core receiving space. The lock core is adapted to be rotated inside the core receiving space upon insertion of a corresponding key into the key hole. The lock core has one end adjacent to the rear end surface of the lock core mounting portion. A latch member is connected to the one end of the lock core and is disposed outwardly of the core receiving space. The second lock casing part has a latch engaging portion with front and rear ends. The latch engaging portion is formed with a latch recess that extends from the front end toward the rear end, and a latch retainer disposed inside the latch recess to partition the latch recess into a latch entrance portion proximate to the front end of the latch engaging portion, and a latch retention portion proximate to the rear end of the latch engaging portion. The latch member is extendible into the latch retention portion via the latch entrance portion and is rotatable thereinside between locking and unlocking positions. The latch retainer engages the latch member when the latch member is disposed in the latch retention portion to prevent removal of the latch member from the latch retention portion in a direction away from the rear end of the latch engaging portion. A second shackle mounting portion extends in a second transverse direction parallel to the first transverse direction from one side of the latch engaging portion. The shackle bar extends between the first and second shackle mounting portions, and has at least one end connected removably to a respective one of the first and second shackle mounting portions.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
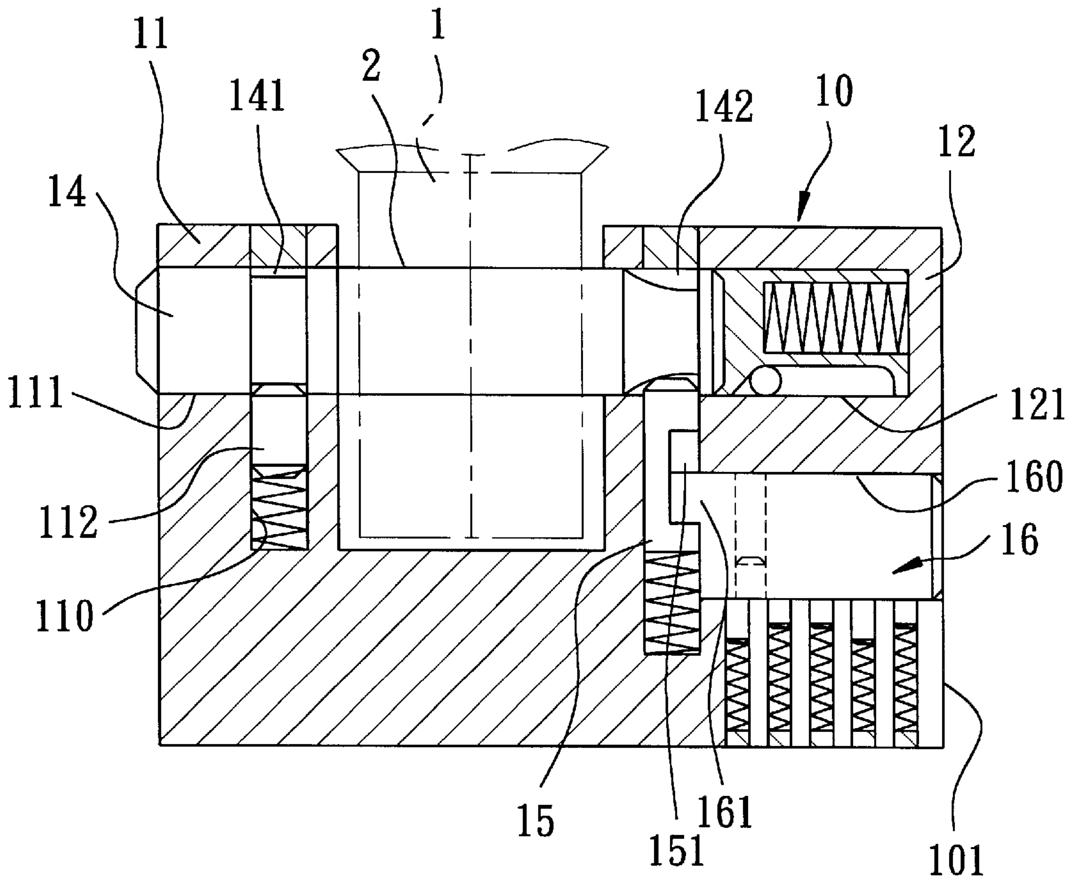
FIG. 1 PRIOR ART
FIG. 1 is a sectional view of a conventional padlock assembly.
Figure 2:
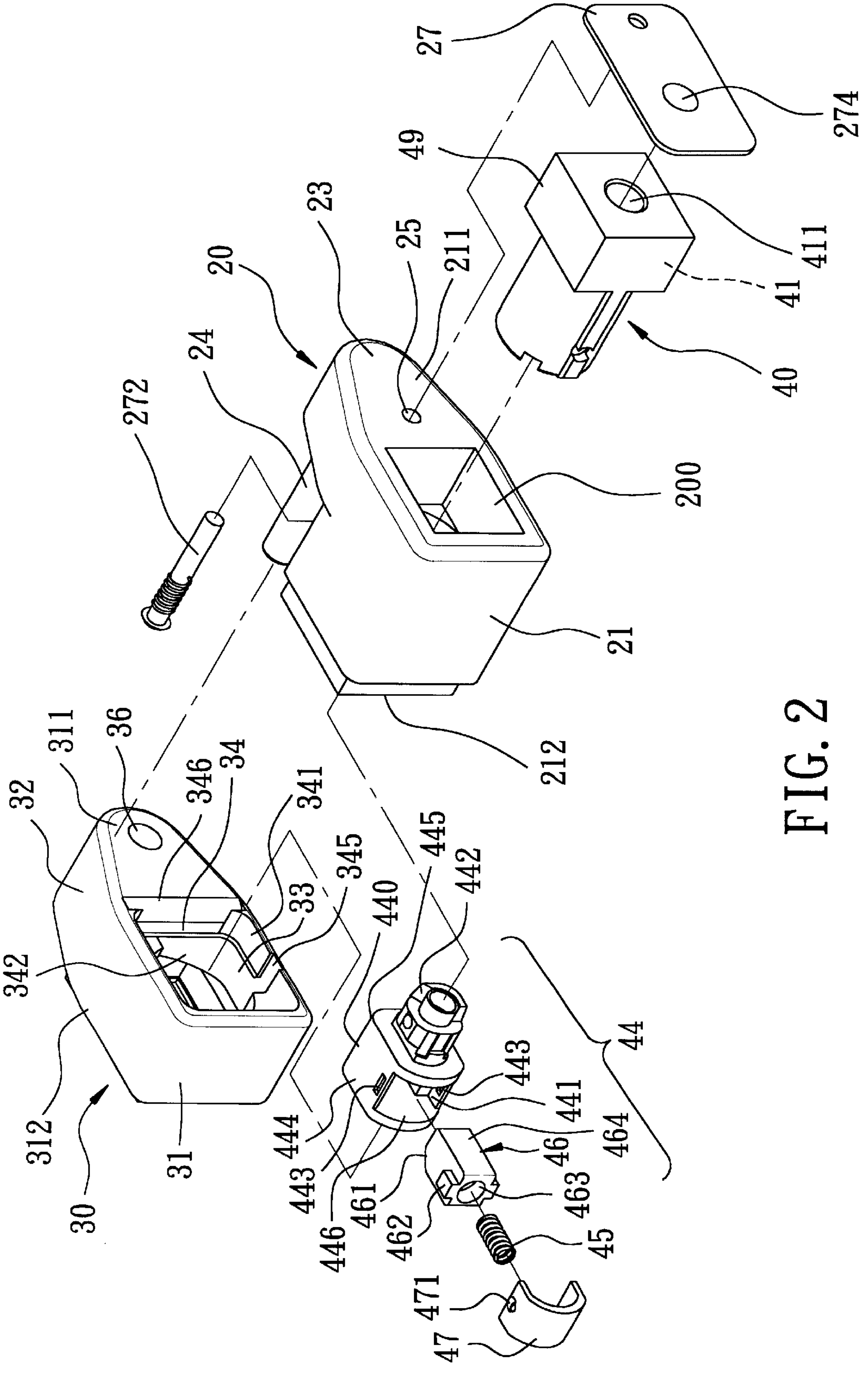
FIG. 2 is an exploded view of the first preferred embodiment of a padlock assembly of the present invention.
Figure 3:
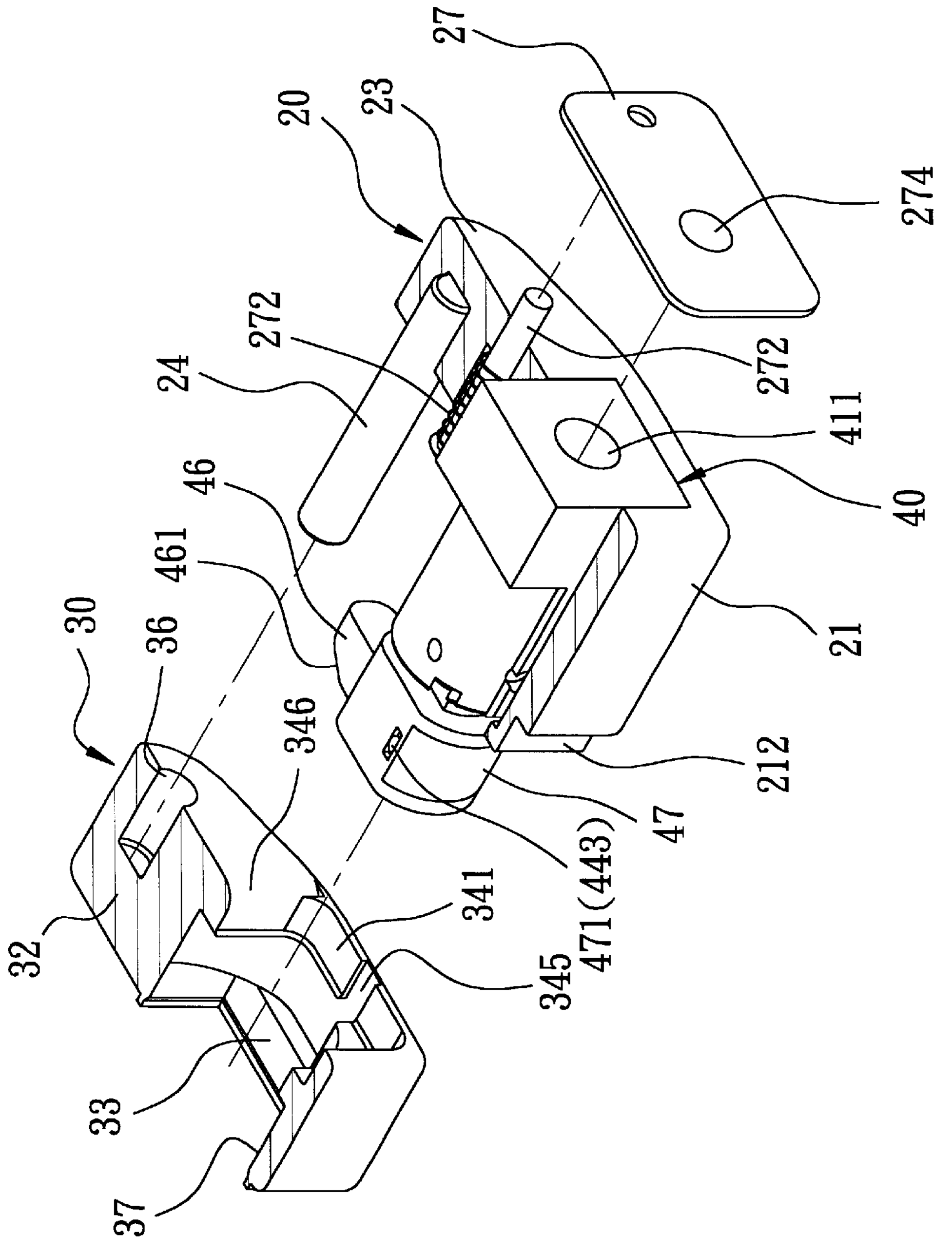
FIG. 3 is a partly exploded sectional view of the first preferred embodiment.
Figure 4:
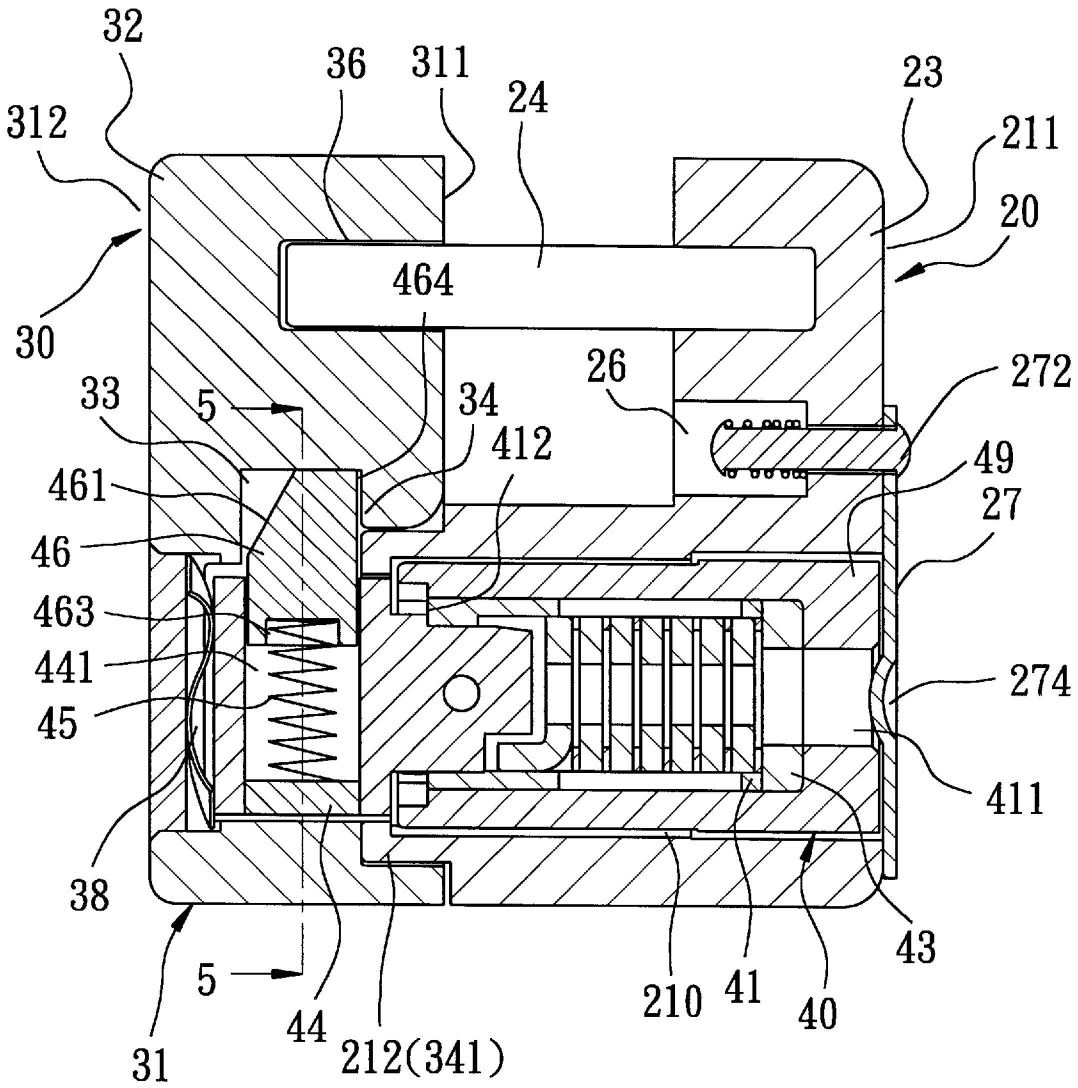
FIG. 4 is a sectional view of the first preferred embodiment.

Referring to FIGS. 2, 3 and 4, the padlock assembly of the first preferred embodiment of the present invention is shown to comprise a first lock casing part 20, a key-operated lock mechanism 40, a second lock casing part 30, and an elongate straight shackle bar 24.

As illustrated, the first lock casing part 20 has a hollow lock core mounting portion 21 with front and rear end surfaces 211, 212 that are spaced apart from each other in a longitudinal direction, and a first shackle mounting portion 23 that extends in a first transverse direction relative to the longitudinal direction from one side of the lock core mounting portion 21. The lock core mounting portion 21 is formed with a core receiving space 210 that extends in the longitudinal direction through the front and rear end surfaces 211, 212.

The lock mechanism 40 includes a cylindrical lock core 41 formed with a key hole 411 and disposed in the core receiving space 210. The lock core 41 is adapted to be rotated inside the core receiving space 210 upon insertion of a corresponding key (not shown) into the key hole 411. The lock core 41 has one end 412 adjacent to the rear end surface 212 of the lock core mounting portion 21. A latch member 44 is connected to the end 412 of the lock core 41 in such a manner that the latch member 44 is disposed outwardly of the core receiving space 210.

Figure 5:
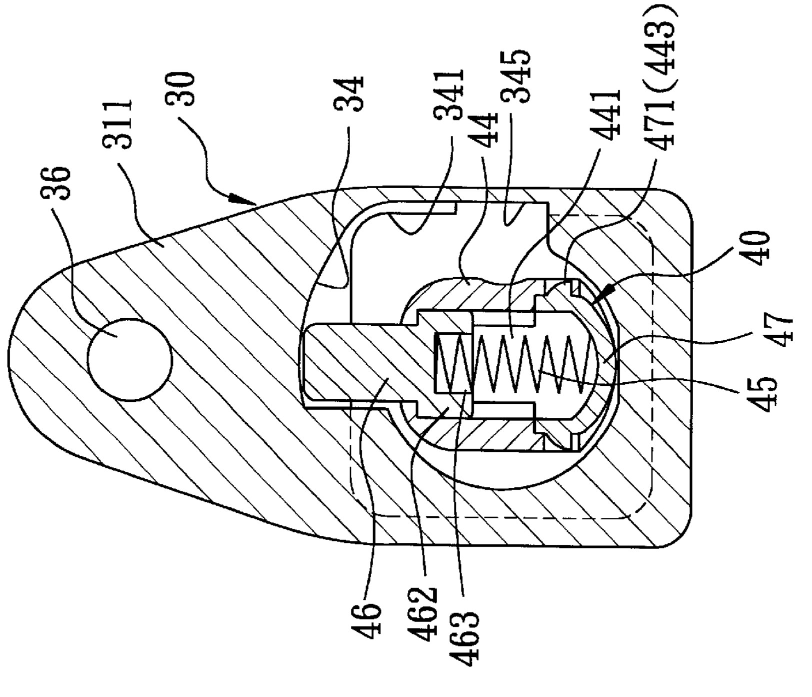
FIG. 5 is a cross-sectional view of the first preferred embodiment taken along lines 5—5 of FIG. 4, illustrating a latch member employed therein in a locking position.

The second lock casing part 30 has a latch engaging portion 31 with front and rear ends 311,312, and a second shackle mounting portion 32 that extends in a second transverse direction parallel to the first transverse direction from one side of the latch engaging portion 31. The latch engaging portion 31 is formed with a latch recess 33 that extends from the front end 311 toward the rear end 312, and a latch retainer 34 disposed inside the latch recess 33 to partition the latch recess 33 into a latch entrance portion 341 proximate to the front end 311 of the latch engaging portion 31, and a latch retention portion 342 proximate to the rear end 312 of the latch engaging portion 31. The latch member 44 is extendible into the latch retention portion 342 via the latch entrance portion 341, and is rotatable inside the latch retention portion 342 between locking and unlocking positions. The latch retainer 34 engages the latch member 44 when the latch member 44 is disposed in the latch retention portion 342 to prevent removal of the latch member 44 from the latch retention portion 342 in a direction away from the rear end 312 of the latch engaging portion 31, as best shown in FIG. 5. The lock core mounting portion 21 has a distal end section with the rear end surface 212 that is extendible into the latch entrance portion 341 of the latch recess 33.

Figure 7:
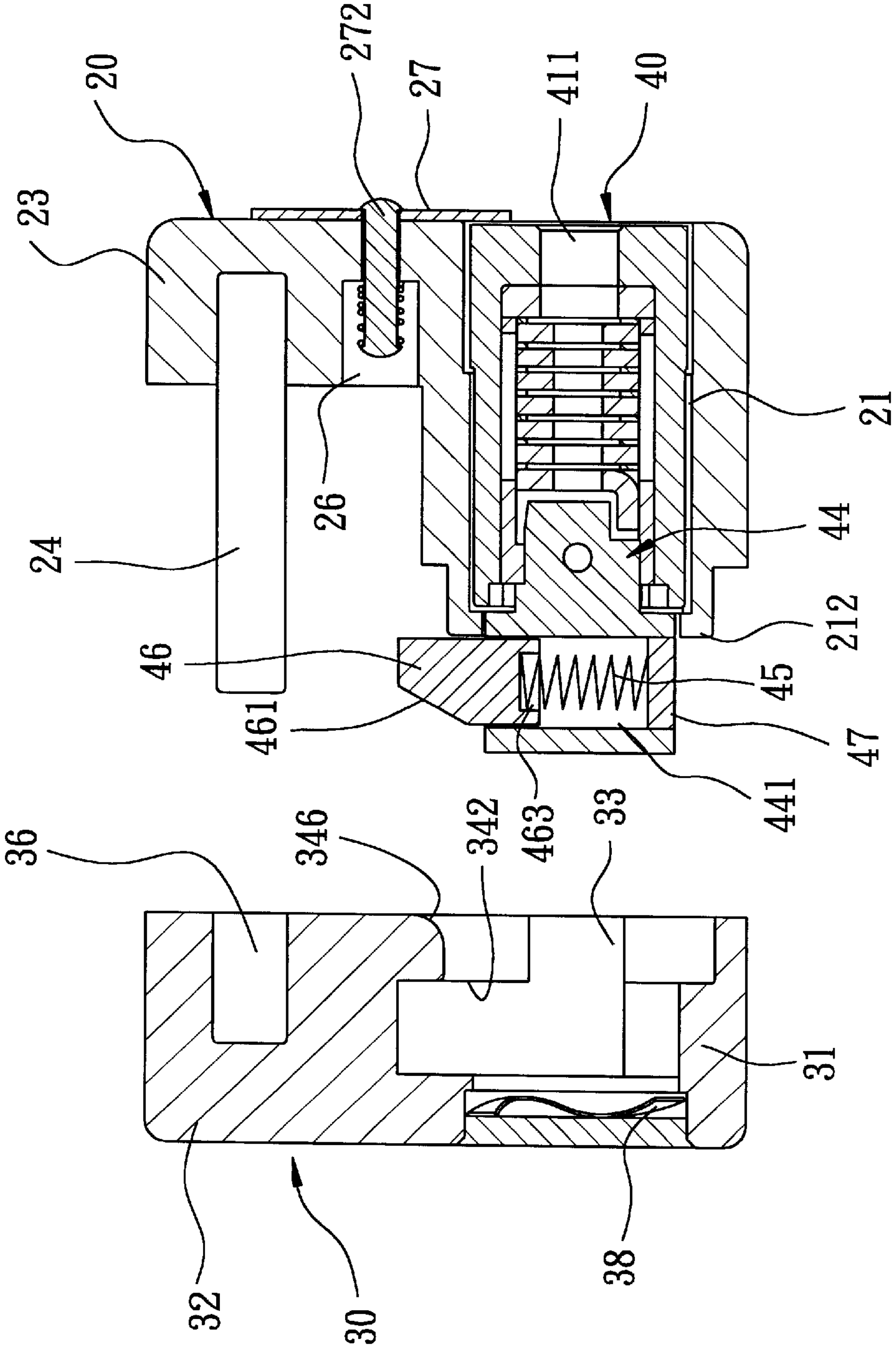
FIG. 7 illustrates how two lock casing parts of the first preferred embodiment are separated from each other.

The shackle bar 34, which is in the form of an elongate straight bar, extends between the first and second shackle mounting portions 23,32, and has a first end mounted fixedly on the first shackle mounting portion 23 (see FIG. 7), and a second end that extends into a shackle insert hole 36 that is formed in the front end 311 of the second shackle mounting portion 32 when the latch member 44 is received in the latch retention portion 342 (see FIG. 4).

Figure 6:
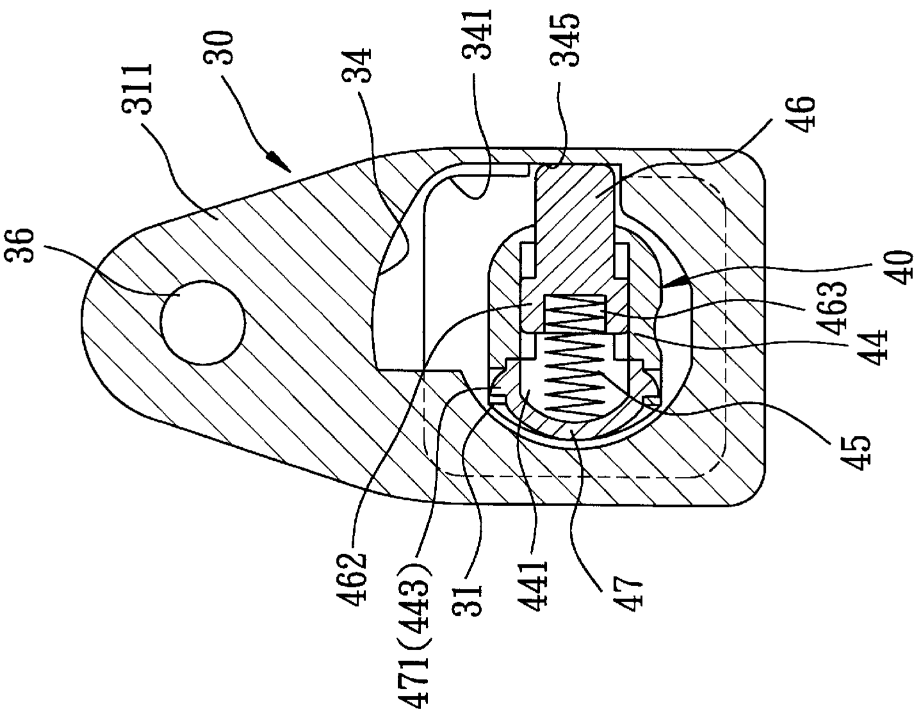
FIG. 6 is a cross-sectional view of the first preferred embodiment, illustrating the latch member employed therein in an unlocking position.

The latch retainer 34 is in the form of a flange that projects into the latch recess 33. The latch retainer 34 is formed with a notch 345 to permit removal of the latch member 44 from the latch recess 33 in the direction away from the rear end 312 of the latch engaging portion 31 when the latch member 44 is in the unlocking position, as best shown in FIG. 6. In this preferred embodiment, the latch member 44 is rotated 90 degrees inside the latch retention portion 342 from the locking position of FIG. 5 so as to align the latch member 44 with the notch 345 prior to moving the latch member 44 out of the latch-recess 33 in the direction away from the latch engaging portion 31.

The latch member 44 includes a latch base 440 with a coupling portion 442 coupled with the end 412 of the lock core 41, a pair of lateral walls 444 that confine a slide passage 441 in a third transverse direction relative to the longitudinal direction, and a latch opening 445 between the lateral walls 445. A spring-loaded latch body 46 is mounted on the latch base 440 inside the slide passage 441. The latch base 440 further has a plate mounting hole 446 opposite to the latch opening 445, and a cover plate 47 with two engaging stubs 471 mounted on the lateral walls 444 to engage two engaging holes 443 in the lateral walls 444 so as to close the plate mounting hole 446. The latch body 46 is preferably provided with a pair of wing projections 462 that abut slidably against the lateral walls 44 along the slide passage 441, and a spring retention blind hole 463 to receive a spring 45 therein such that the spring 45 abuts against the cover plate 47 and urges the latch body 46 to extend outwardly of the latch opening 445 along the slide passage 441. Note that the wing projections 462 of the latch body 46 engage the periphery of the latch opening 445 to prevent removal of the latch body 46 from the slide passage 441.

The front end 311 of the latch engaging portion 31 is further formed with an inclined guide surface 346 for retracting the latch body 46 against the biasing action of the spring 45 into the slide passage 441 when the latch member 44 is brought toward the rear end 312 of the latch engaging portion 31. The latch body 46 has a bevel face 461 for sliding past the latch retainer 34, and an abutment face 464 opposite to the bevel face 461 for engaging the latch retainer 34 so as to prevent removal of the latch member 44 from the latch recess 33 in the direction away from the rear end 312 of the latch engaging portion 31.

Figure 8:
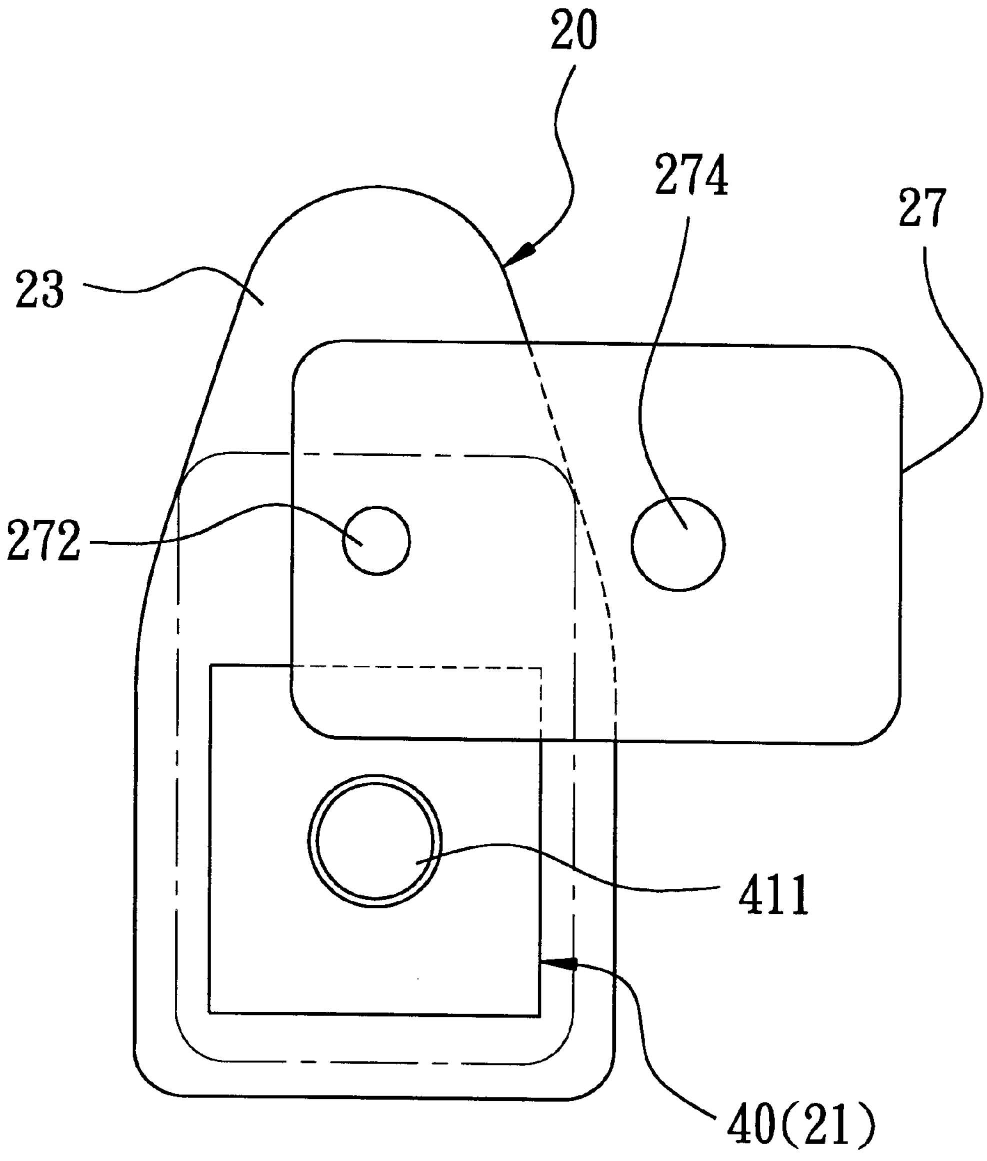
FIG. 8 is a front side view of the first preferred embodiment, illustrating how a dust cover uncovers a key hole for insertion of a corresponding key.
Figure 9:
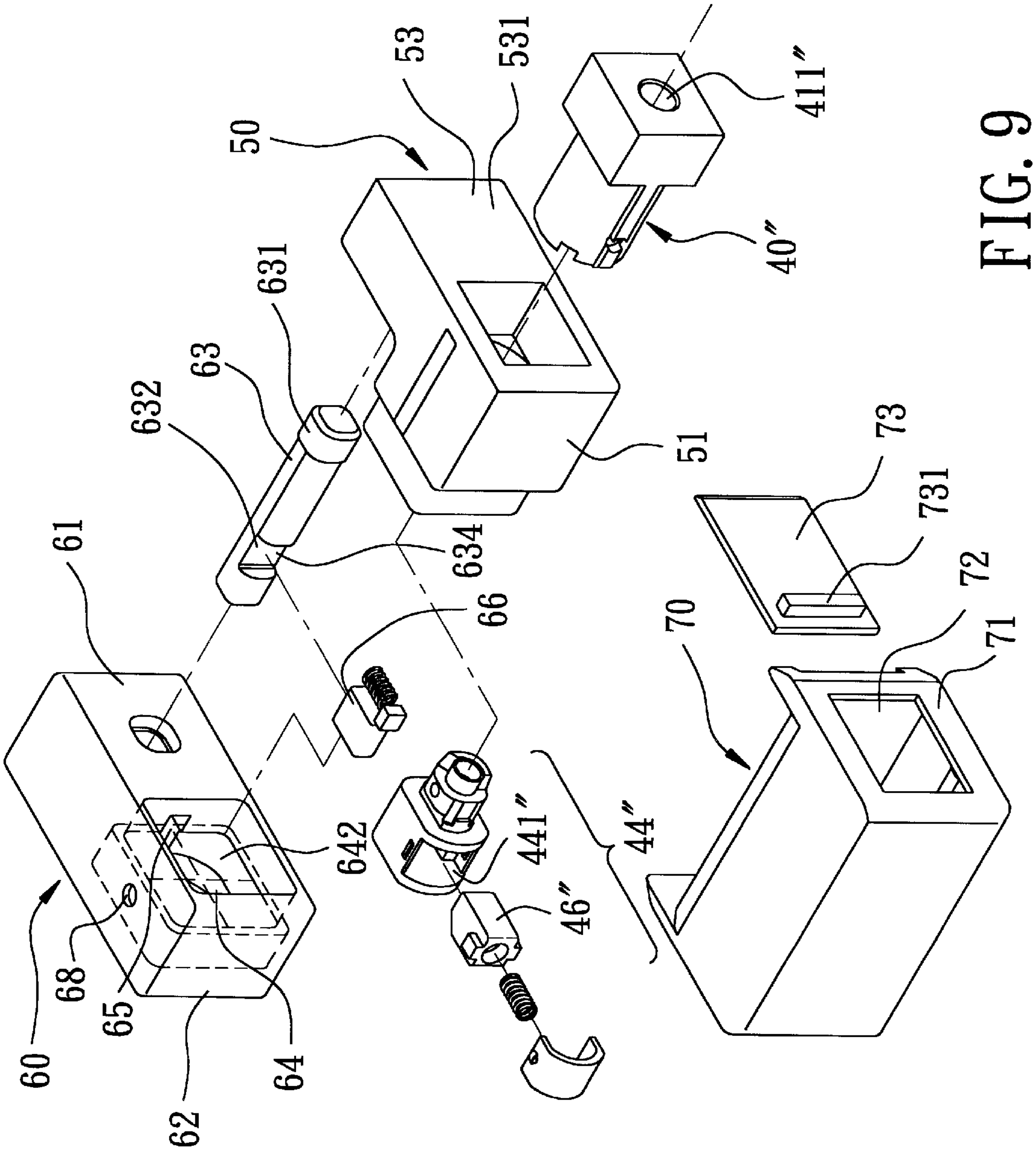
FIG. 9 is an exploded view of a second preferred embodiment of a padlock assembly of the present invention.
Figure 10:
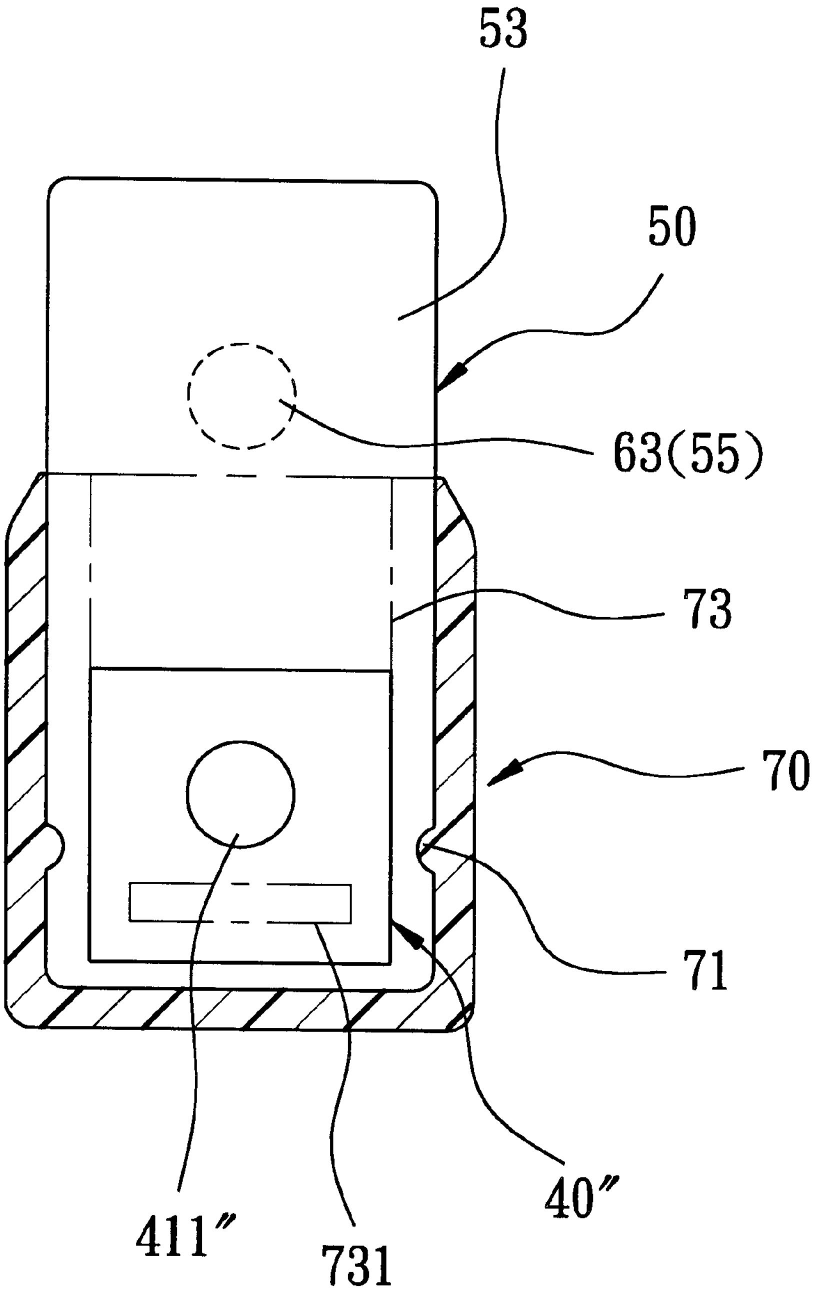
FIG. 10 is a front side view of the second preferred embodiment, illustrating how a dust cover uncovers a key hole for insertion of a corresponding key.

In the first preferred embodiment, a dust cover 27 is mounted on the first lock casing part 20 at the front end surface 211 of the lock core mounting portion 21 in such a manner so as to be movable between a covering position, where the dust cover 27 shields the key hole 411, and an uncovering position, as best shown in FIG. 8, where the dust cover 27 exposes the key hole 411 to permit insertion of the key thereinto. A spring-loaded retainer 272, in the form of a spring-loaded bolt, is provided for mounting pivotally and resiliently the dust cover 27 on the first lock casing part 20 about an axis parallel to the longitudinal direction such that the dust cover 27 is biased toward the first lock casing part 20. The dust cover 27 is preferably formed with a boss 274 that extends removably into the key hole 411 when the dust cover 27 is in the covering position.

The lock mechanism 40 further includes a tubular lock housing 49 received in the core receiving space 210 and having the lock core 41 rotatably mounted therein in a known manner. Preferably, a protective plate 43 is interposed between the tubular lock housing 49 and the lock core 41 adjacent to the front end surface 211 of the lock core mounting portion 21 so as to prevent destruction of the lock core 41 with the use of a drilling tool.

When the latch body 46 is retracted within the latch base 444 along the slide passage 441, has a size sufficient for retraction into the core receiving space 210 and for removal of the lock mechanism 40 from the core receiving space 210. Thus, the lock mechanism 40 can be replaced with a new set when damaged, such as in the event of spring fatigue.

The rear end 312 of the latch engaging portion 31 is preferably provided with a buffer 38 in the form of a spring strip that extends into the latch recess 33 to prevent impact between the latch member 44 and the rear end 312 of the latch engaging portion 31.

Referring again to FIG. 7, when locking an object, the user only needs to insert one end of the shackle bar 24 through the engaging hole in the object. The second lock casing part 30 is coupled with the first lock casing part 20 by inserting the latch member 44 into the latch retention portion 31, and the shackle bar 24 into the shackle insert hole 36. This eliminates the problem of feeling the engaging hole in the object with the assistance of one's fingers as required in the conventional padlock assembly.

Figure 11A:
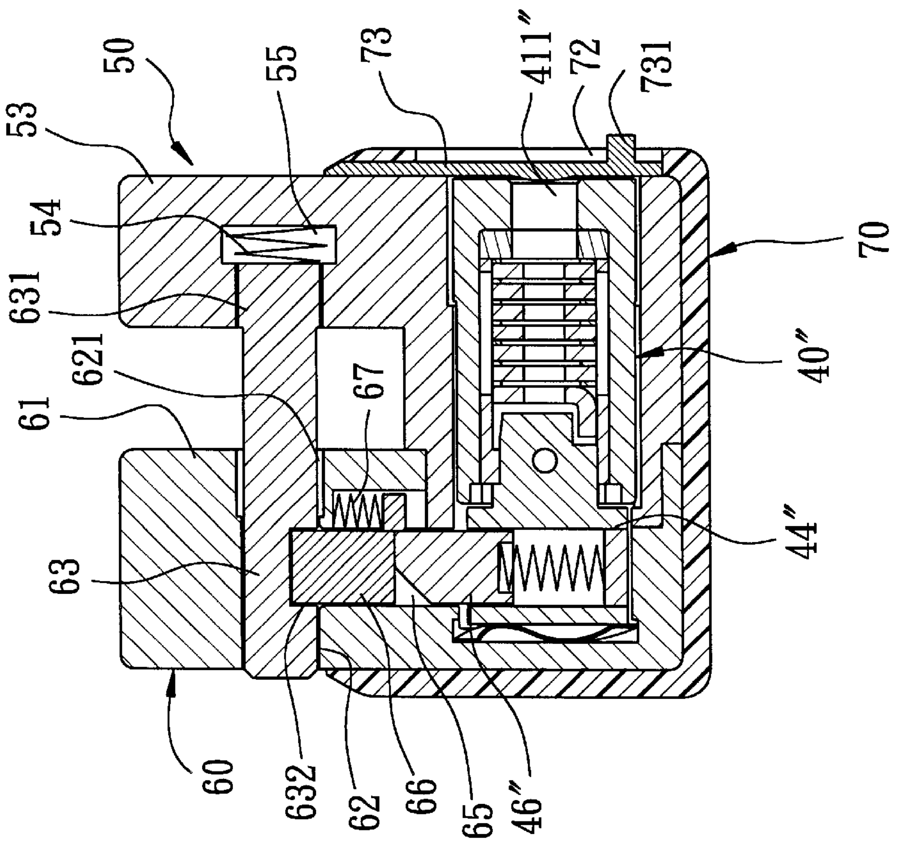
FIG. 11(A) is a sectional view of the second preferred embodiment, illustrating the latch member employed therein at the locking position.
Figure 11B:
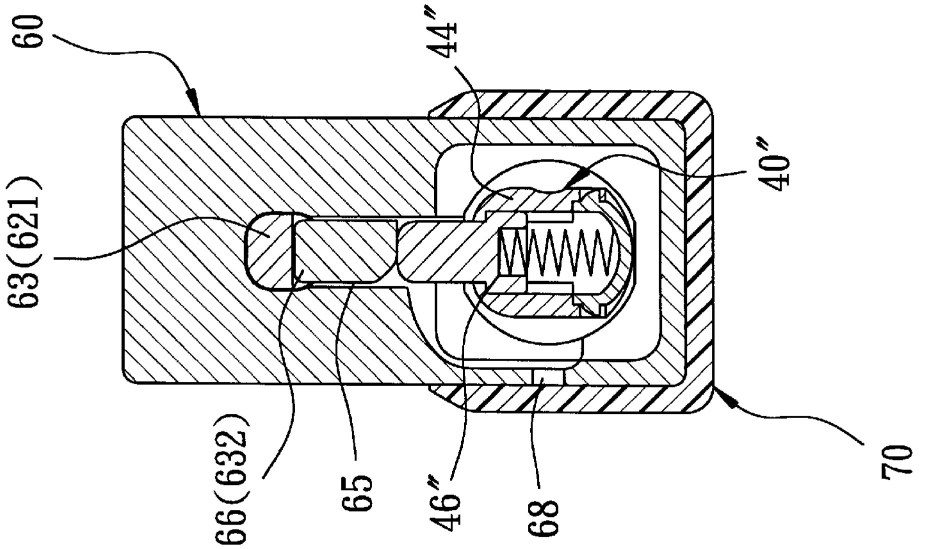
FIG. 11(B) is a sectional view of the second preferred embodiment from another angle, illustrating the latch member employed therein at the locking position.
Figure 12A:
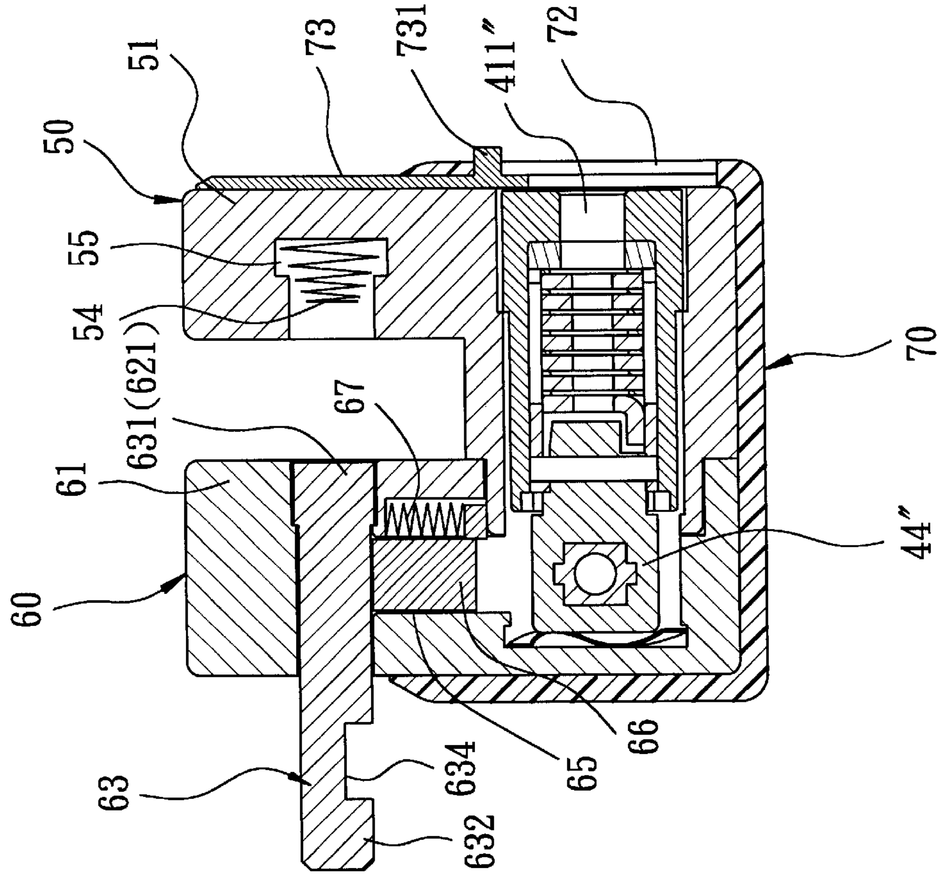
FIG. 12(A) is a sectional view of the second preferred embodiment, illustrating the latch member employed therein at the unlocking position.
Figure 12B:
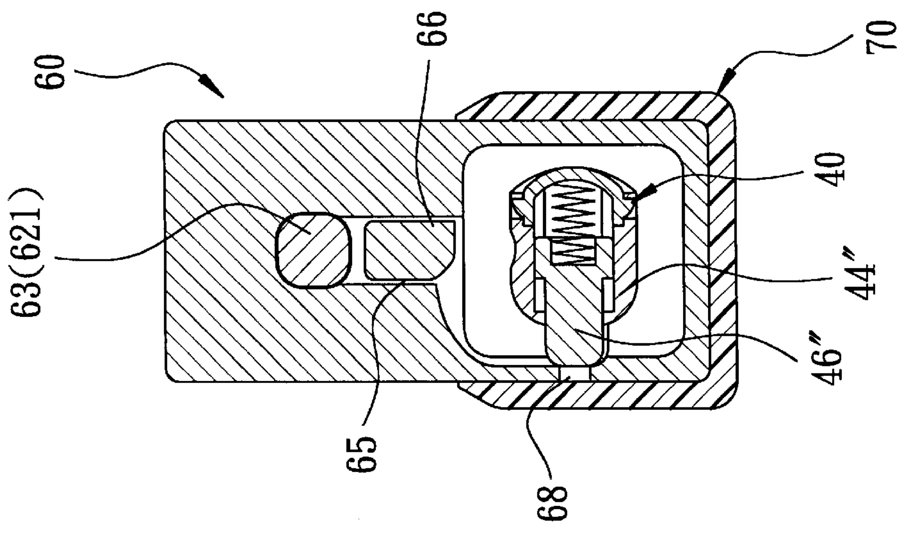
FIG. 12(B) is a sectional view of the second preferred embodiment from another angle, illustrating the latch member employed therein at the unlocking position.

Referring to FIGS. 9 to 12(B), a second preferred embodiment of the present invention is shown to be similar to the first preferred embodiment in construction, except the first shackle mounting portion 53 is formed with a blind insert hole 54 (see FIG. 11(A)) for engaging slidably and removably the first end 631 of the shackle bar 63. The second shackle mounting portion 61 is formed with a through hole 621 for engaging slidably the second end 632 of the shackle bar 63. The second end 632 of the shackle bar 63 is formed with a latch engaging groove 634.

The second lock casing part 60 further has a slide channel 65 extending in the second transverse direction from the latch retention portion 642 of the latch recess 64 to the through hole 621, and a spring-loaded latch bar 66 slidably disposed in the slide channel 65 and biased in the second transverse direction to extend outwardly of the through hole 621 and toward the latch retention portion 642 of the latch recess 64. The latch member 44" forces the latch bar 66 to extend into the through hole 621 and to engage the shackle bar 63 in the latch engaging groove 634 when the latch member 44" is in the locking position.

Preferably, the blind insert hole 54 has a biasing member 55 disposed therein to bias the first end 631 of the shackle bar 63 outwardly thereof. The latch engaging portion 62 is further formed with a radial hole 68 adapted to permit insertion of a tool (not shown) therein for retracting the latch body 46" into the slide passage 441" to permit removal of the latch member 44" from the latch recess 64 in the direction away from the rear end of the latch engaging portion 62 when the latch body 46" is aligned with the radial hole 68 (see FIG. 11(B)) in the unlocking position.

A hollow casing retainer 70 is provided for receiving the lock core mounting portion 51 of the first lock casing part 50 and the latch engaging portion 62 of the second lock casing part 60 fittingly therein. The casing retainer 70 has a front wall portion 71 proximate to the front end surface 531 of the lock core mounting portion 51 and formed with a window opening 72 for access to the key hole 411". A dust cover 73 is slidably retained between the front end surface 531 of the lock core mounting portion 51, and the front wall portion 71 of the casing retainer 70. The dust cover 73 is further formed with a handle 731 that projects into the window opening 72 to facilitate movement of the dust cover 73 between the covering and uncovering positions.

With this invention thus explained, it is apparent that numerous modifications and variations can be made without departing from the scope and spirit of this invention. It is therefore intended that this invention be limited only as indicated in the appended claims.

I claim:

1. A padlock assembly comprising:

(a) a first lock casing part having
 a hollow lock core mounting portion with front and rear end surfaces that are spaced apart from each other in a longitudinal direction, said lock core mounting portion being formed with a core receiving space that extends in the longitudinal direction through said front and rear end surfaces, and
 a first shackle mounting portion that extends in a first transverse direction relative to the longitudinal direction from one side of said lock core mounting portion;

(b) a key-operated lock mechanism including
 a cylindrical lock core formed with a key hole and disposed in said core receiving space, said lock core being adapted to be rotated inside said core receiving space upon insertion of a corresponding key into said key hole, said lock core having one end adjacent to said rear end surface of said lock core mounting portion, and
 a latch member connected to said one end of said lock core and disposed outwardly of said core receiving space;

(c) a second lock casing part having
 a latch engaging portion with front and rear ends, said latch engaging portion being formed with a latch recess that extends from said front end toward said rear end, and a latch retainer disposed inside said latch recess to partition said latch recess into a latch entrance portion proximate to said front end of said latch engaging portion, and a latch retention portion proximate to said rear end of said latch engaging portion, said latch member being extendible into said latch retention portion through said latch entrance portion and being rotatable inside said latch retention portion between locking and unlocking positions, said latch retainer engaging said latch member when said latch member is disposed in said latch retention portion to prevent removal of said latch member from said latch retention portion in a direction away from said rear end of said latch engaging portion, and
 a second shackle mounting portion that extends in a second transverse direction parallel to the first transverse direction from one side of said latch engaging portion; and (d) a shackle bar extending between said first and second shackle mounting portions, said shackle bar having opposite first and second ends, at least one of which is connected removably to a respective one of said first and second shackle mounting portions; and said latch member including a latch base coupled to said one end of said lock core and formed with a slide passage that extends in a third transverse direction relative to the longitudinal direction; and a spring-loaded latch body mounted on said latch base inside said slide passage, said latch body being biased to extend outwardly of said slide passage so as to project in the third transverse direction relative to said lock core mounting portion.

2. The padlock assembly as defined in claim 1, wherein said latch base has a coupling portion for coupling with said one end of said lock core, a pair of lateral walls that confine said slide passage therebetween, and a latch opening between said lateral walls to permit extension of said latch body out of said slide passage.

3. The padlock assembly as defined in claim 2, wherein said latch base further has a plate mounting hole opposite to said latch opening, and a cover plate mounted on said lateral walls to close said plate mounting hole.

4. The padlock assembly as defined in claim 3, wherein said latch body has a spring that abuts against said cover plate, and a pair of wing projections that abut slidably and respectively against said lateral walls.

5. The padlock assembly as defined in claim 3, wherein said lateral walls are provided with two engaging holes, said cover plate being formed with two engaging stubs for engaging said engaging holes so as to mount said cover plate on said lateral walls.

6. The padlock assembly as defined in claim 1, wherein said latch retainer is in a form of a flange that projects into said latch recess.

7. The padlock assembly as defined in claim 6, wherein said latch retainer is formed with a notch to permit removal of said latch member from said latch recess in the direction away from said rear end of said latch engaging portion when said latch member is in the unlocking position.

8. The padlock assembly as defined in claim 6, wherein said front end of said latch engaging portion is further formed with an inclined guide surface for retracting said latch body into said slide passage when said latch member is brought toward said rear end of said latch engaging portion.

9. The padlock assembly as defined in claim 7, wherein said latch body has a bevel face for sliding past said latch retainer, and an abutment face opposite to said bevel face for engaging said latch retainer so as to prevent removal of said latch member from said latch recess in the direction away from said rear end of said latch engaging portion.

10. The padlock assembly as defined in claim 1, wherein said lock mechanism further includes a tubular lock housing received in said core receiving space and having said lock core rotatably disposed therein.

11. The padlock assembly as defined in claim 10, wherein said latch member has a size sufficient for retraction into said core receiving space and for removal of said lock mechanism from said core receiving space when said latch body is retracted into said slide passage.

12. The padlock assembly as defined in claim 6, wherein said latch engaging portion is formed with a radial hole adapted to permit insertion of a tool therein for retracting said latch body into said slide passage to permit removal of said latch member from said latch recess in the direction away from said rear end of said latch engaging portion when said latch body is aligned with said radial hole in the unlocking position.

13. A padlock assembly comprising:

(a) a first lock casing part having a hollow lock core mounting portion with front and rear end surfaces that are spaced apart from each other in a longitudinal direction, said lock core mounting portion being formed with a core receiving space that extends in the longitudinal direction through said front and rear end surfaces, and a first shackle mounting portion that extends in a first transverse direction relative to the longitudinal direction from one side of said lock core mounting portion;

(b) a key-operated lock mechanism including a cylindrical lock core formed with a key hole and disposed in said core receiving space, said lock core being adapted to be rotated inside said core receiving space upon insertion of a corresponding key into said key hole, said lock core having one end adjacent to said rear end surface of said lock core mounting portion, and a latch member connected to said one end of said lock core and disposed outwardly of said core receiving space;

(c) a second lock casing part having a latch engaging portion with front and rear ends, said latch engaging portion being formed with a latch recess that extends from said front end toward said rear end, and a latch retainer disposed inside said latch recess to partition said latch recess into a latch entrance portion proximate to said front end of said latch engaging portion, and a latch retention portion proximate to said rear end of said latch engaging portion, said latch member being extendible into said latch retention portion through said latch entrance portion and being rotatable inside said latch retention portion between locking and unlocking positions, said latch retainer engaging said latch member when said latch member is disposed in said latch retention portion to prevent removal of said latch member from said latch retention portion in a direction away from said rear end of said latch engaging portion, and a second shackle mounting portion that extends in a second transverse direction parallel to the first transverse direction from one side of said latch engaging portion; and (d) a shackle bar extending between said first and second shackle mounting portions, said shackle bar having opposite first and second ends, at least one of which is connected removably to a respective one of said first and second shackle mounting portions; and said rear end of said latch engaging portion is provided with a buffer that extends into said latch recess to prevent impact between said latch member and said rear end of said latch engaging portion.

* * * * *